United States Patent
Wu (10) Patent No.: US 8,767,638 B2
(45) Date of Patent: Jul. 1, 2014

(54) METHOD OF HANDLING RESOURCE ASSIGNMENT AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 821 days.

(21) Appl. No.: 12/850,636

(22) Filed: Aug. 5, 2010

(65) Prior Publication Data

US 2011/0032890 A1    Feb. 10, 2011

Related U.S. Application Data

(60) Provisional application No. 61/231,678, filed on Aug. 6, 2009.

(51) Int. Cl.
| | |
|---|---|
| H04W 4/00 | (2009.01) |
| H04W 72/04 | (2009.01) |
| H04W 76/00 | (2009.01) |
| H04W 88/08 | (2009.01) |
| H04L 5/00 | (2006.01) |
| H04L 12/56 | (2006.01) |

(52) U.S. Cl.
CPC ............... H04W 72/04 (2013.01); H04W 76/00 (2013.01); *H04W 88/08* (2013.01); *H04L 5/003* (2013.01); *H04L 45/16* (2013.01)
USPC ............ 370/329; 370/431; 370/432; 370/433

(58) Field of Classification Search
CPC ..... H04W 72/04; H04W 88/08; H04W 76/00; H04L 5/003; H04L 45/16
See application file for complete search history.

(56) References Cited

U.S. PATENT DOCUMENTS

| | | | |
|---|---|---|---|
| 8,239,721 B2* | 8/2012 | Pelletier et al. | 714/749 |
| 2003/0147371 A1* | 8/2003 | Choi et al. | 370/341 |
| 2004/0077346 A1 | 4/2004 | Krenik | |
| 2004/0114618 A1* | 6/2004 | Tong et al. | 370/431 |
| 2008/0019263 A1 | 1/2008 | Stolpman | |
| 2009/0086849 A1 | 4/2009 | Tsai | |
| 2010/0195614 A1* | 8/2010 | Nimbalker et al. | 370/330 |
| 2010/0232373 A1* | 9/2010 | Nory et al. | 370/329 |

FOREIGN PATENT DOCUMENTS

| | | |
|---|---|---|
| CN | 101064955 A | 10/2007 |
| EP | 1 804 452 A1 | 7/2007 |
| WO | WO 2007029965 A1 | 3/2007 |

OTHER PUBLICATIONS

Motorola, Common PDCCH Design for Carrier Aggregation, 3GPP TSG RAN1#56bis, R1-091327, Mar. 23-27, 2009, pp. 1-2, Seoul, Korea, XP-002597046.

(Continued)

*Primary Examiner* — Robert C Scheibel
*Assistant Examiner* — Lonnie Sweet
(74) *Attorney, Agent, or Firm* — Winston Hsu; Scott Margo (57) ABSTRACT

A method of handling resource assignment for a network in a wireless communication system includes configuring a plurality of component carriers to a mobile device for simultaneous data transmission and reception, and sending the mobile device physical downlink control channel (PDCCH) signaling corresponding to a first component carrier of the plurality of component carriers on a second component carrier of the plurality of component carriers.

6 Claims, 6 Drawing Sheets

(56) References Cited

OTHER PUBLICATIONS

Office action mailed on Dec. 12, 2012 for the China application No. 201010251782.8, filing date Aug. 6, 2010, p. 1-7.
3GPP TR 36.814 V0,4.1 Technical Specification Group Radio Access Network; Further Advancements for E-UTRA Physical Layer Aspects (Release 9), Feb. 2009.
3GPP TSG-RAN WG1 Meeting #57 R1-092230, Panasonic, "PDCCH design for carrier aggregation," May 4-8, 2009, p. 1-9.
3GPP TSG RAN WG1 Meeting #49bis R1-072865, LG Electronics, "An RV definition scheme with variable starting Positions", Jun. 25-29, 2007.
Office action mailed on Jul. 26, 2013 for the Taiwan application No. 099126285, filing Aug. 6, 2010, p. 1-9.

* cited by examiner

METHOD OF HANDLING RESOURCE ASSIGNMENT AND RELATED COMMUNICATION DEVICE

CROSS REFERENCE TO RELATED APPLICATIONS

This application claims the benefit of U.S. Provisional Application No. 61/231,678, filed on Aug. 6, 2009 and entitled "Method to transmit and receive resource assignment in multiple connections in wireless communications system" the contents of which are incorporated herein.

BACKGROUND OF THE INVENTION

1. Field of the Invention

The present invention relates to a method used in a wireless communications system and related communication device, and more particularly, to a method of handling resource assignment in a wireless communications system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, a radio access network known as an evolved universal terrestrial radio access network (E-UTRAN) includes a plurality of evolved Node-Bs (eNBs) for communicating with a plurality of user equipments (UEs) and communicates with a core network including a mobility management entity (MME), serving gateway, etc for NAS (Non Access Stratum) control. A long term evolution-advanced (LTE-A) system, as its name implies, is an evolution of the LTE system, with carrier aggregation and relay deployment. The carrier aggregation, where two or more component carriers are aggregated, allows a UE of the LTE-A system to simultaneously transmit and receive data via multiple carriers, where the UE of the LTE system can only utilize one carrier for data transmission at any time.

In the LTE system, resource assignment can be achieved by a physical downlink control channel (PDCCH) used to carry a message known as Downlink Control Information (DCI) with certain DCI format. The PDCCH message includes resource assignment and other control information, e.g. a transmission power control (TPC) command, a downlink assignment including a physical downlink shared channel (PDSCH) related information, and a uplink grant including a physical uplink shared channel (PUSCH) related information, for a UE or group of UEs. The downlink assignment is downlink resource assignment, whereas the uplink grant is uplink resource assignment.

In the LTE-A system, how to allocate a PDCCH for a UE when the network configures the UE to use multiple component carriers (carrier aggregation) has not been considered. To follow the LTE system a scheme that one PDCCH on one component carrier may be adopted. However, such allocation wastes PDCCH resources because each component carrier has to be assigned one PDCCH. Besides, the UE has to receive PDCCH on each component carrier. This means the UE has to turn on its receiver for receiving PDCCH signaling on each component carrier and thereby wastes UE power.

SUMMARY OF THE INVENTION

The disclosure therefore provides a method and related communication device for handling resource assignment, to avoid waste of power and radio resources.

A method of handling resource assignment for a network in a wireless communication system is disclosed. The method includes configuring a plurality of component carriers to a mobile device for simultaneous data transmission and reception, and sending the mobile device physical downlink control channel (PDCCH) signaling corresponding to a first component carrier of the plurality of component carriers on a second component carrier of the plurality of component carriers.

A method of handling resource assignment for a mobile device in a wireless communication system is disclosed. The method includes enabling a plurality of component carriers for simultaneous data transmission and reception according to first configuration received from a network, and receiving PDCCH signaling corresponding to a first component carrier of the plurality of component carriers on a second component carrier of the plurality of component carriers.

A method of handling resource assignment for a network in a wireless communication system is disclosed. The method includes configuring a plurality of component carriers to a mobile device for simultaneous data transmission and reception, and configuring to the mobile device on which of the plurality of component carriers the mobile device needs to transmit the same data.

A method of handling resource assignment for a mobile device in a wireless communication system is disclosed. The method includes enabling a plurality of component carriers to a mobile device for simultaneous data transmission and reception according to first configuration received from a network, and setting at least some of the plurality of component carriers for same data transmission according to second configuration received from the network.

A communication device of a wireless communication system for handling resource assignment is disclosed. The communication device includes means for configuring a plurality of component carriers to a mobile device for simultaneous data transmission and reception, and means for sending the mobile device physical downlink control channel (PDCCH) signaling corresponding to a first component carrier of the plurality of component carriers on a second component carrier of the plurality of component carriers.

A communication device of a wireless communication system for handling resource assignment is disclosed. The communication device includes means for enabling a plurality of component carriers for simultaneous data transmission and reception according to first configuration received from a network, and means for receiving PDCCH signaling corresponding to a first component carrier of the plurality of component carriers on a second component carrier of the plurality of component carriers.

A communication device of a wireless communication system for handling resource assignment is disclosed. The communication device includes means for configuring a plurality of component carriers to a mobile device for simultaneous data transmission and reception, and means for configuring to the mobile device on which of the plurality of component carriers the mobile device needs to transmit the same data.

A communication device of a wireless communication system for handling resource assignment is disclosed. The communication device includes means for enabling a plurality of component carriers for simultaneous data transmission and reception according to first configuration received from a network, and means for setting at least some of the plurality of component carriers for same data transmission according to second configuration received from the network.

These and other objectives of the present disclosure will no doubt become obvious to those of ordinary skill in the art after reading the following detailed description of the preferred example that is illustrated in the various figures and drawings.

DETAILED DESCRIPTION

Figure 1:
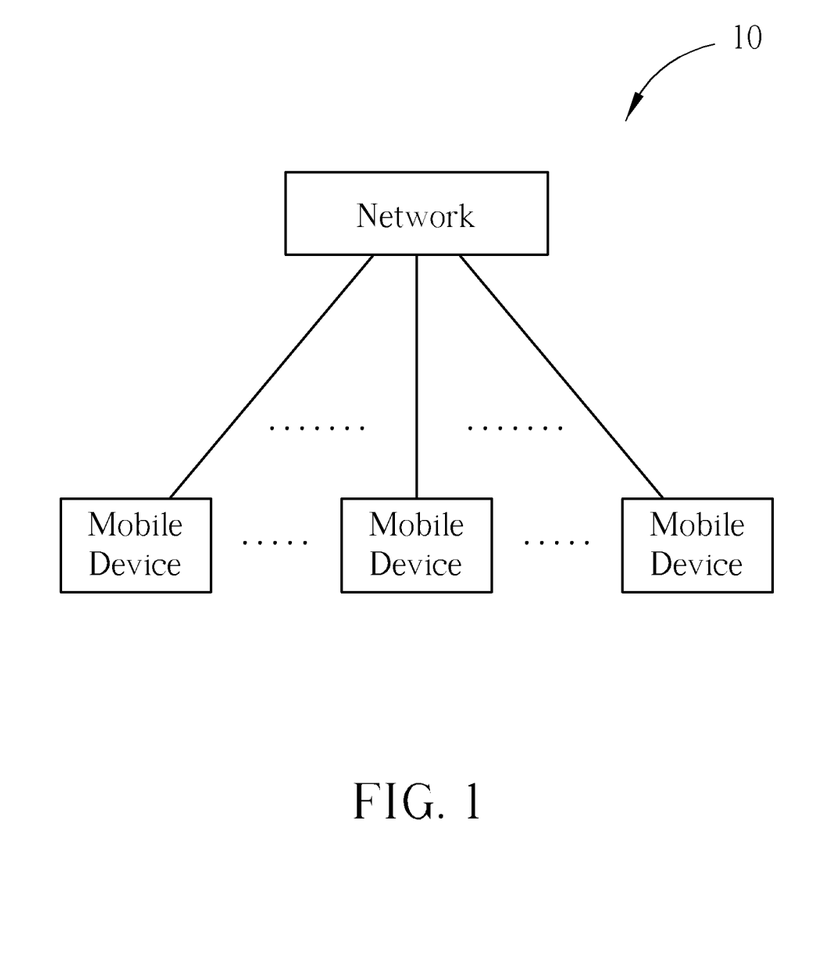
FIG. 1 is a schematic diagram of an exemplary wireless communications system.

Please refer to FIG. 1, which illustrates a schematic diagram of an exemplary wireless communication system 10. Briefly, the wireless communication system 10 is composed of a network and a plurality of mobile devices. The wireless communication system 10 can be a long term evolution-advanced (LTE-A) system or other system supporting simultaneous transmission/reception on multiple component carriers for each mobile device (e.g. carrier aggregation) and/or coordinated multiple point (CoMP) transmission/reception. The component carriers can be regarded as frequency bands corresponding to different central frequencies. The simultaneous transmission/reception on multiple component carriers means that data belonging to a logic link or an radio resource control (RRC) connection can be transmitted or received on the each of the component carriers. In the LTE-A system, the network can be referred as a E-UTRAN (evolved-UTRAN) comprising a plurality of eNBs, whereas the mobile devices are referred as to user equipments (UEs) that can be devices such as mobile phones, computer systems, etc. This terminology will be used throughout the application for ease of reference, however, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
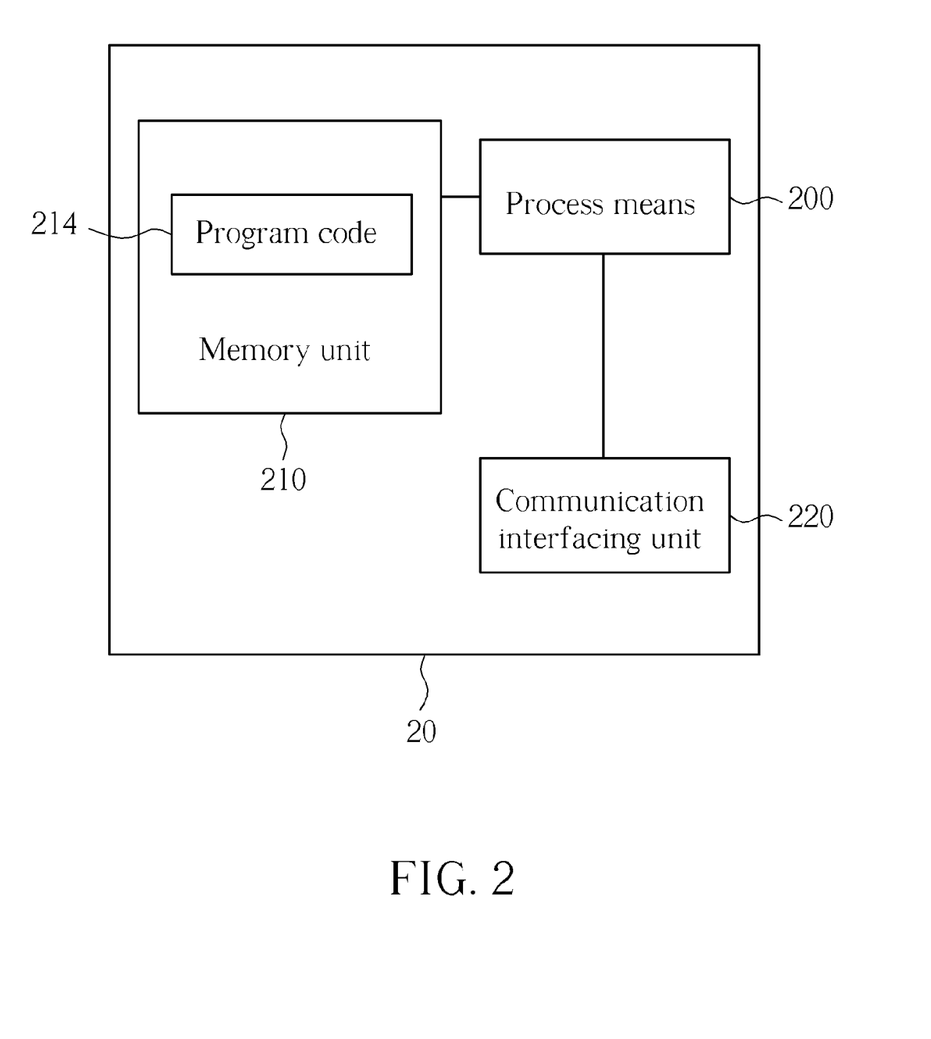
FIG. 2 is a schematic diagram of an exemplary communication device.

Please refer to FIG. 2, which illustrates a schematic diagram of an exemplary communication device 20. The communication device 20 may be a mobile device or the network of FIG. 1 and include a process means 200 such as a microprocessor or ASIC (Application-Specific Integrated Circuit), a memory unit 210 and a communication interfacing unit 220. The memory unit 210 may be any data storage device that can store program code 214 for access by the process means 200. Examples of the memory unit 210 include but are not limited to a subscriber identity module (SIM), read-only memory (ROM), random-access memory (RAM), CD-ROMs, magnetic tapes, hard disks, and optical data storage devices. The communication interfacing unit 220 may be preferably a radio transceiver and accordingly exchanges wireless signals with other communication devices according to processing results of the process means 200. The program code 214 may include configuration of radio resource control (RRC), medium access control (MAC) and physical layers. The RRC layer can control the physical layer for managing multiple component carriers and related RRC connections, e.g. carrier aggregation enabling, component carrier activation/deactivation, maximum component carrier number management, establishment, re-establishment, reconfiguration or release of the RRC connections, etc. Thus, the process means 200 can control the communication interfacing unit 220 to receive signaling/data at certain frequency band(s) and time(s) according to the processing results of the program code 214. The physical layer may access one or more physical downlink control channels (PDCCH) at one time for receiving signaling about resource assignment, e.g. a downlink assignment or a uplink grant. The MAC layer may perform one or more hybrid automatic repeat request (HARQ) process through which data or control MAC packet can be received and decoded. In each HAQ process, an HARQ acknowledgement (ACK) is reported if the data/control MAC packet is received and decoded successfully. Otherwise, an HARQ negative acknowledgement (NACK) is reported.

Figure 3:
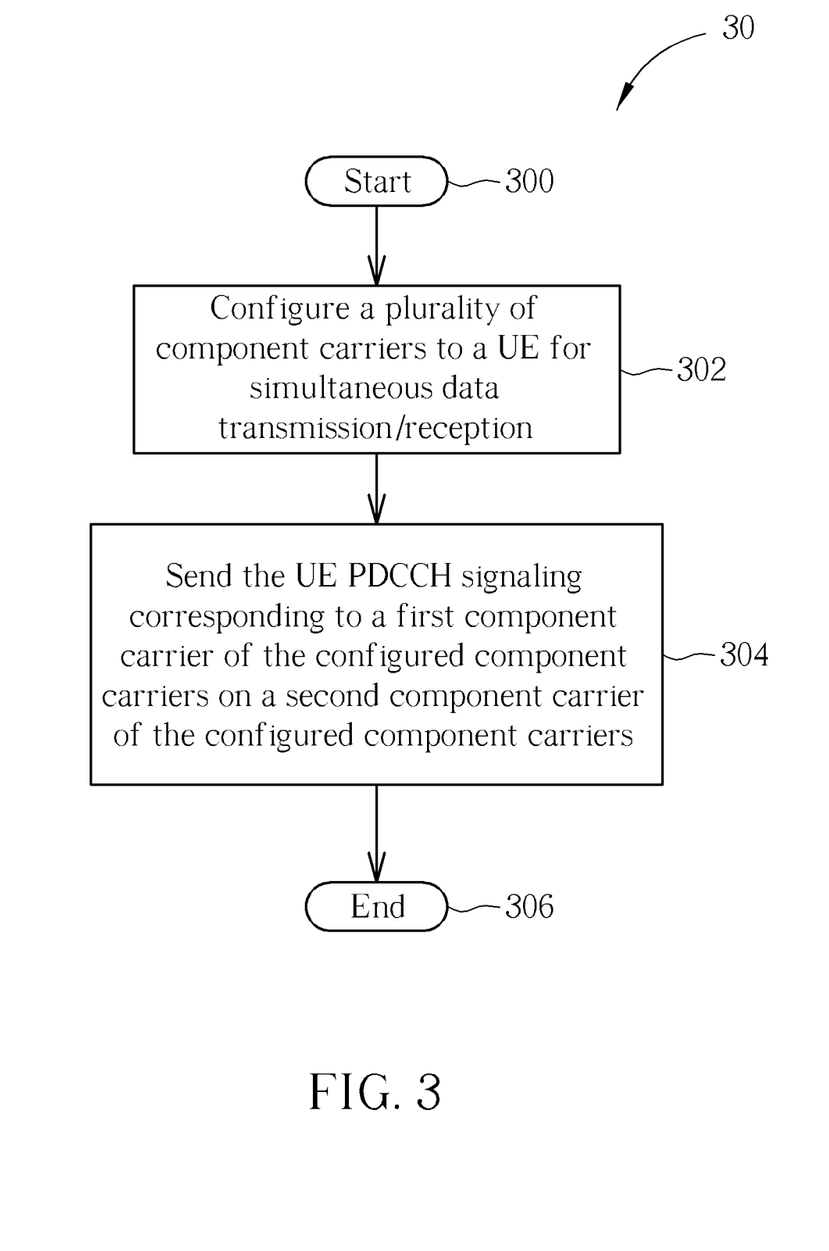
FIG. 3 is a flowchart of an exemplary process.

Please refer to FIG. 3, which is a flowchart of an exemplary process 30 that is provided for handling resource assignment for a network (e.g. the network of FIG. 1) in a wireless communications system. The process 30 may be compiled into the program code 214 and includes the following steps:

Step 300: Start.

Step 302: Configure a plurality of component carriers to a UE for simultaneous data transmission/reception.

Step 304: Send the UE PDCCH signaling corresponding to a first component carrier of the configured component carriers on a second component carrier of the configured component carriers.

Step 306: End.

According to the process 30, the network configures the mobile device to activate carrier aggregation with multiple component carriers. The network may flexibly assign resource for the UE by sending PDCCH signaling corresponding to one component carrier (e.g. the first component carrier) on another second component carrier (e.g. the second component carrier).

Figure 4:
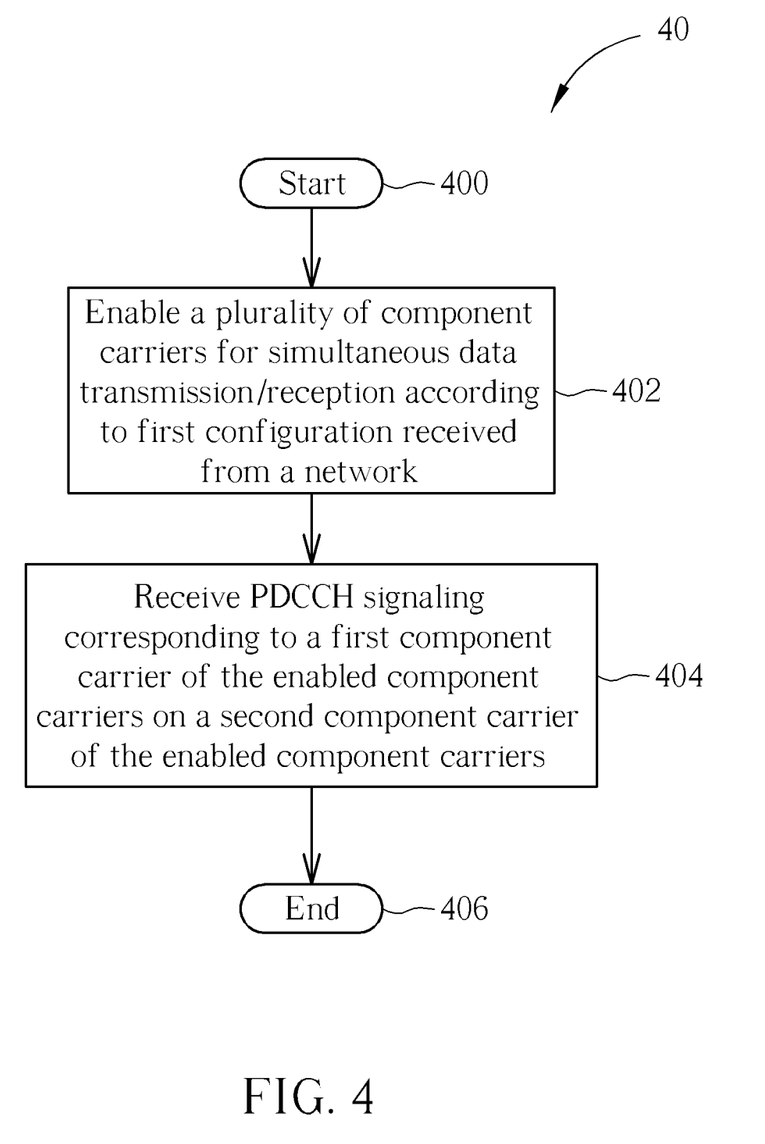
FIG. 4 is a flowchart of an exemplary process.

Please refer to FIG. 4, which is a flowchart of an exemplary process 40 that is provided for handling resource assignment for a UE (e.g. the mobile device of FIG. 1) to react to the process 30. The process 40 may be compiled into the program code 214 and includes the following steps:

Step 400: Start.

Step 402: Enable a plurality of component carriers for simultaneous data transmission/reception according to first configuration received from a network.

Step 404: Receive PDCCH signaling corresponding to a first component carrier of the enabled component carriers on a second component carrier of the enabled component carriers.

Step 406: End.

According to the process 40, the UE activates carrier aggregation by enabling multiple capable component carriers according to the first configuration. Further, the UE can receive PDCCH signaling corresponding to one component carrier on another component carrier according to the second configuration. The first and second configurations may be sent by the network via different messages or in one message.

As well known, the UE consumes electric power each time switching its transceiver on or keeping the transceiver switched on for data/signaling reception. To save power consumption of the UE, the network may configure to the UE that some/all of the component carriers of the UE share the same PDCCH signaling. The network may use an RRC message (e.g. RRCConnectionReconfiguration message) to configure the UE which component carriers share the same PDCCH signaling. Accordingly, the UE sets that the configured component carriers for sharing the same PDCCH signaling. For example, the UE is configured with component carriers A, B and C. The network can configure to the UE that the component carriers A, B and C share PDCCH signaling. In this situation, the UE may receive PDCCH signaling on the component carriers A so that the UE does not need to receive the PDCCH signaling on component carriers B and C. The network then can transmits DL assignments or UL grants for the component carriers A, B and C on a PDCCH of the component carrier A. In another scenario of configuration, the network can configure the UE to receive PDCCH signalings on the component carriers A and B respectively, and the UE does not need to receive any PDCCH signaling on the component carrier C. The network either transmits DL assignments or UL grants for the component carrier C on the PDCCH of the component carrier A or B. As can be seen from the above, the UL grants or DL assignments for a component carrier are transmitted on the PDCCH of another/other component carrier(s), thereby saving PDCCH resources and related power consumptions. In addition, in response to uplink data from the UE, the network may transmit a HARQ ACK/NACK on the component carrier carrying PDCCH signaling or on one of the component carriers not carrying PDCCH.

The UE may apply an UL grant/DL assignment to each of the component carriers sharing the same PDCCH signaling when receiving the UL grant/DL assignment on a PDCCH of one of the component carriers sharing the same PDCCH signaling. For example, the network transmits a single DL assignment on one of the component carriers sharing the PDCCH signaling, and the UE applies this DL assignment to each of the component carriers sharing the PDCCH signaling, i.e. the UE receives data on each of the component carriers sharing the PDCCH signaling. Similarly, the network transmits a single UL grant and the UE applies this UL grant to each of the component carriers sharing the PDCCH signaling, i.e. the UE transmits data on each of the component carriers sharing the PDCCH signaling.

In addition, the network may further configure the UE to transmit the same data or different data on each of the component carrier sharing the PDCCH signaling when the UE receives an uplink grant of the PDCCH signaling on one of the component carrier sharing the PDCCH signaling. When the same data transmission is used, performance of the data transmission in cell edge area is improved. In other words, the cell coverage is improved because of repeating data transmission on the component carriers.

The UE may switch off hardware functions responsible for data/signaling reception of a component carrier unless the UE receives a DL assignment/UL grant which assigns DL/UL resources of the component carrier, where the UE is not configured with any PDCCH corresponding to the component carrier or configured to receive a HARQ ACK/NACK on the component carrier. For example, the UE switches on the hardware functions responsible for receiving data/signaling of a component carrier A, where the UE is not configured with any PDCCH, when the UE receives a DL assignment/UL grant which allocates DL/UL resources of the component carrier A on the PDCCH of a component carrier B. Thus, the UE power can be saved by only switching on the hardware functions responsible for the component carrier that is configured to transmit PDCCH signaling.

The network may transmit a DL assignment/UL grant on a PDCCH which specifically allocates DL or UL resources of a component carrier. For example, the network configures the UE with two component carriers A and B. When the network attempts to transmit data on the component carriers A and B, the network transmits a DL assignment which allocates DL resources of the component carrier A and another DL assignment which allocates DL resources of the component carrier B in the same subframe, e.g. in the same PDCCH message or in two separate PDCCH messages. Accordingly, the UE receives the PDCCH message including the DL assignments/UL grants or the two separate PDCCH messages including the DL assignments/UL grants. According to the arranged positions of the DL assignments/uplink grants in the PDCCH message, the UE can determine which component carrier each of the DL assignments/UL grants corresponds to and then applies the DL assignments/UL grants to corresponding component carrier.

In addition, the UE may determine which component carriers share the same PDCCH signaling, according to configuration of each of the enabled component carriers. For example, the network configures two component carriers A and B to the UE. The UE determines that the component carrier B does not have a PDCCH, because the UE finds that no system information is broadcasted on the component carrier B. In this situation, the UE determines that UL or DL resources of the component carrier B are allocated on a PDCCH of the component carrier A.

Based on the concept of data/signaling sharing for multiple component carriers, the UE can save power/resources.

Figure 5:
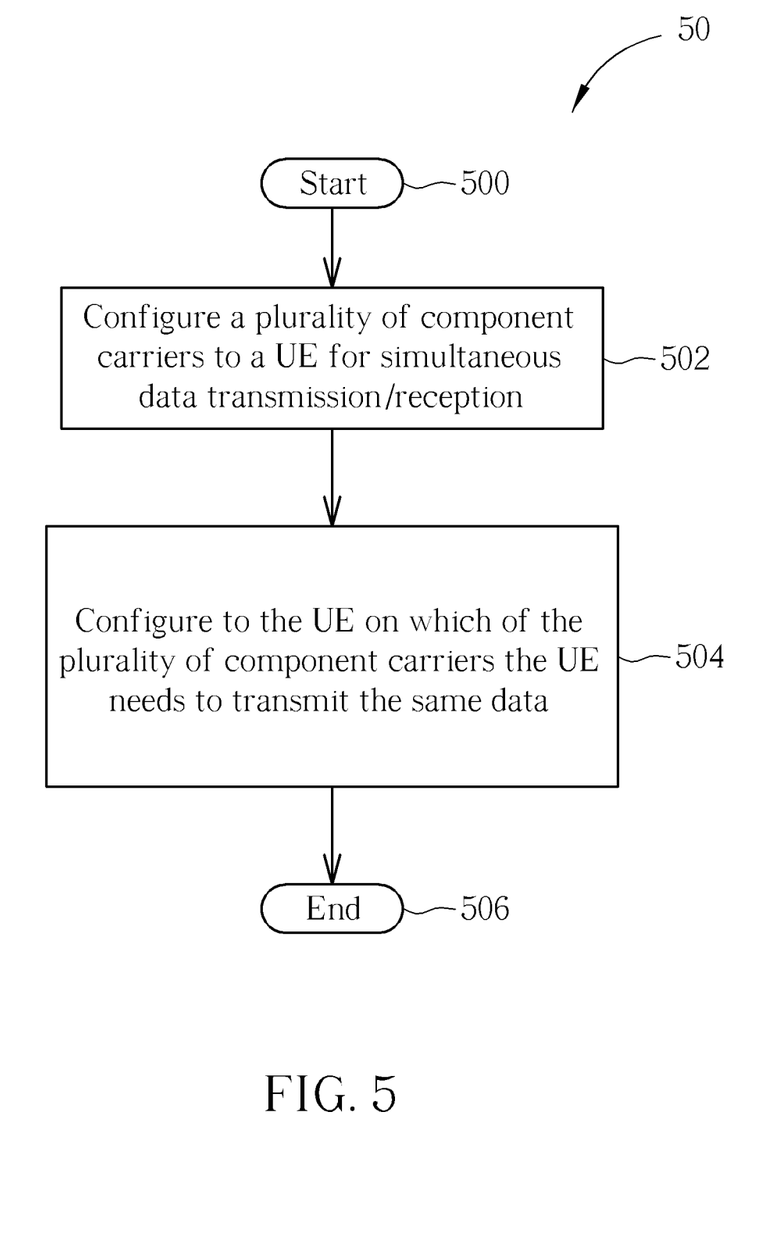
FIG. 5 is a flowchart of an exemplary process.

Please refer to FIG. 5, which is a flowchart of an exemplary process 50 that is provided for handling resource assignment for a network (e.g. the network of FIG. 1) in a wireless communications system. The process 50 may be compiled into the program code 214 and includes the following steps:

Step 500: Start.

Step 502: Configure a plurality of component carriers to a UE for simultaneous data transmission/reception.

Step 504: Configure to the UE on which of the plurality of component carriers the UE needs to transmit the same data.

Step 506: End.

According to the process 50, the network configures the mobile device to activate carrier aggregation with multiple component carriers. The network may configure the UE to transmit the same data on some/all of the component carriers for simultaneous data transmission/reception.

Figure 6:
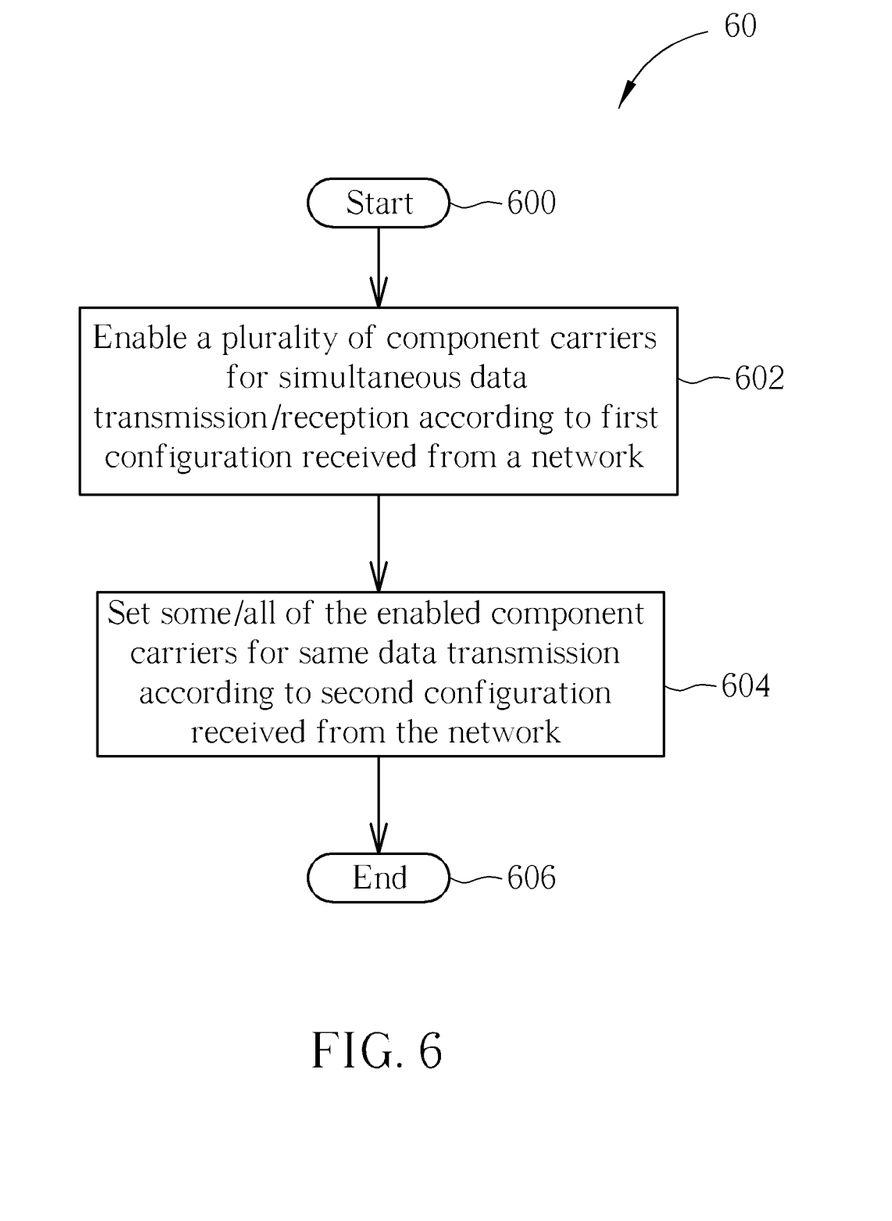
FIG. 6 is a flowchart of an exemplary process.

Please refer to FIG. 6, which is a flowchart of an exemplary process 60 that is provided for handling resource assignment for a UE (e.g. the mobile device of FIG. 1) to react to the process 50. The process 60 may be compiled into the program code 214 and includes the following steps:

Step 600: Start.

Step 602: Enable a plurality of component carriers for simultaneous data transmission/reception according to first configuration received from a network.

Step 604: Set some/all of the enabled component carriers for same data transmission according to second configuration received from the network.

Step 606: End.

According to the process 60, the UE activates carrier aggregation by enabling multiple capable component carriers according to the first configuration. Further, according to the second configuration, the UE sets some/all of the enabled component carriers and transmits the same data transmission on the set component carriers if needed. The first and second configurations may be sent by the network via different messages or in one message. The message may be an RRC message (e.g. RRCConnectionReconfiguration message).

For example, the network configures the UE with component carriers D, E and F. The network can configure the UE to transmit different data on the component carriers D, E and F. Alternatively, the network can configure the UE to transmit the same data on the component carriers D, E and to transmit different data on the component carrier F. When the same data transmission is used, performance of the data transmission in the cell edge is improved. In other words, the cell coverage is improved because of repeating data transmission on the component carriers.

The network may configure the UE by sending a PDCCH message in a subframe. Accordingly, the UE determines which component carriers the UE should transmit the same data on, according to the PDCCH message. For example, the PDCCH message may include explicit information to command the UE to transmit the same data or different data. In an alternative, the UE may determine to transmit the same data or different data according to whether the received PDCCH message includes a UL grant or multiple UL grants. If the PDCCH message only includes one UL grant, the UE transmits the same data. Otherwise, the UE transmits the different data.

The UE may transmit/retransmit the same data in coded blocks by applying incremental redundancy coding scheme or chase combining coding scheme. For example, assume that a first component carrier and a second component carrier are configured for the same data transmission. Possible redundancy versions (RVs) include RV0-RV3. RV2, RV3, RV1, RV0 are incremental versions of RV0, RV2, RV3, RV1, respectively. Each of the RV0-RV3 corresponds to a starting point in a cyclic buffer of the UE for soft decoding. The cyclic buffer is used for storing payload data of a MAC packet for being decoded. Detailed functions of the RV0-RV3 should be well known in the art and can refer to related LTE MAC layer specifications. The UE generates and transmits a first transport block (coded block) with a redundancy version (RV) 0 on a first component carrier and a second transport block with a RV 2 on a second component carrier. The network performs HARQ soft combing to decode the same data received from the first transport block with RV 0 and the second transport block with RV 2. The network may transmit a HARQ ACK/NACK according to the decoding status of the HARQ soft combing. If the network successfully decodes the same data, the network transmits HARQ ACK(s). Otherwise, the network transmits HARQ NACK(s). For example, the network may transmit a HARQ ACK/NACK on only one of the component carriers for the same data transmission. If the UE receives a HARQ NACK from any of the first and second component carriers, the UE may generate and retransmit a third transport block with RV 3 on the first component carrier and a fourth transport block with RV 1 in the second component carrier. The first, second, third and fourth transport blocks are generated based on the same data (e.g. user-plane data). The network performs HARQ soft combing to decode the same data received from the first transport block with RV 3 and the second transport block with RV 1.

In addition, if the network configures the UE to transmit the same data on some of the enabled component carriers, the UE may retransmit the same data on each of the configured component carriers when the UE receives a HARQ NACK on any of the configured component carriers. If the network configures the UE to transmit same data on all of the enabled component carriers, the UE may retransmit the same data on some of the enabled component carriers when the UE receives a HARQ NACK on each of the enabled component carriers.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the examples provide ways for network to transmit resource assignment control information (e.g. PDCCH signaling) on multiple component carriers. Ways for the UE (mobile device) to receive the resource assignment control information and to apply the resource assignment are accordingly provided. Mainly, the ways are made under the information sharing concept and/or the duplicated/repeated data transmission in order to save UE power consumption and radio resources.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A communication device of a wireless communication system for handling resource assignment for a network in a wireless communication system, the communication device comprising:
    a process means for executing a program code; and
    a memory unit coupled to the process means for storing the program code;
        wherein the program code instructs the processor means to perform the following steps:
        configuring a plurality of component carriers to a mobile device for simultaneous data transmission and reception;
        sending to the mobile device physical downlink control channel (PDCCH) signaling corresponding to a first component carrier of the plurality of component carriers on a second component carrier of the plurality of component carriers; and
        configuring to the mobile device that the first component carrier and the second component carrier share the same PDCCH signaling;
        wherein sending to the mobile device the PDCCH signaling corresponding to the first component carrier on the second component carrier of the plurality of component carriers comprises:
            transmitting to the mobile device a first downlink assignment that allocates downlink resources of the first component carrier on a PDCCH of the second component carrier; and
        further comprising:
            transmitting a second downlink assignment that allocates downlink resources of the second component carrier on the PDCCH of the second component carrier; or
        wherein sending to the mobile device the PDCCH signaling corresponding to the first component carrier on the second component carrier of the plurality of component carriers comprises:
            transmitting to the mobile device a first uplink grant that allocates uplink resources of the first component carrier on the PDCCH of the second component carrier; and
        further comprising:
            transmitting a second uplink grant that allocates uplink resources of the second component carrier on the PDCCH of the second component carrier.

2. The communication device of claim 1, wherein configuring to the mobile device that the first component carrier and the second component carrier share the same PDCCH signaling comprises:

not transmitting any PDCCH signaling or any system information on the first component carrier.

3. A communication device of a wireless communication system for handling resource assignment for a mobile device in a wireless communication system, the communication device comprising:

a process means for executing a program code; and
a memory unit coupled to the process means for storing the program code;
wherein the program code instructs the processor means to perform the following steps:
enabling a plurality of component carriers for simultaneous data transmission and reception according to first configuration received from a network;
receiving physical downlink control channel (PDCCH) signaling corresponding to a first component carrier of the plurality of component carriers on a second component carrier of the plurality of component carriers;
setting that the first component carrier and the second component carrier share the same PDCCH signaling according to second configuration received from the network;
receiving a PDCCH message including a plurality of downlink assignments or a plurality of uplink grants on the second component carrier;
determining to which component carrier each of downlink assignments corresponds, according to the arranged positions of the plurality of downlink assignments in the PDCCH message; or
determining to which component carrier each of uplink grants corresponds, according to the arranged positions of the plurality of uplink grants in the PDCCH message.

4. The communication device of claim 3 further comprising:

receiving an uplink grant or a downlink assignment on a PDCCH of the second component carrier; and
applying the uplink grant or the downlink assignment to each of the first component carrier and the second component carrier.

5. The communication device of claim 3 further comprising:

switching off hardware functions responsible for data reception of the first component carrier except when the mobile device receives an uplink grant assigning uplink resources of the first component carrier or a downlink assignment assigning downlink resources of the first component carrier, wherein the mobile device is not configured with a PDCCH corresponding to the first component carrier or configured to receive a hybrid automatic repeat request (HARQ) acknowledgement (ACK) or an HARQ negative acknowledgement (NACK) on the first component carrier.

6. The communication device of claim 3 further comprising:

determining that the first component carrier is not configured with a PDCCH when the mobile device finds that no system information is broadcasted on the first component carrier.

* * * * *